(12) United States Patent
Ben Dayan et al.

(10) Patent No.: US 11,579,992 B2
(45) Date of Patent: *Feb. 14, 2023

(54) METHODS AND SYSTEMS FOR RAPID FAILURE RECOVERY FOR A DISTRIBUTED STORAGE SYSTEM

(71) Applicant: Weka.IO Ltd, Tel Aviv (IL)

(72) Inventors: Maor Ben Dayan, Tel Aviv (IL); Omri Palmon, Tel Aviv (IL); Liran Zvibel, Tel Aviv (IL)

(73) Assignee: Weka.IO Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 17/832,917

(22) Filed: Jun. 6, 2022

(65) Prior Publication Data

US 2022/0308970 A1    Sep. 29, 2022

Related U.S. Application Data

(63) Continuation of application No. 16/121,491, filed on Sep. 4, 2018, now Pat. No. 11,385,980.

(60) Provisional application No. 62/585,166, filed on Nov. 13, 2017.

(51) Int. Cl.
*G06F 11/00* (2006.01)
*G06F 11/20* (2006.01)
*G06F 11/10* (2006.01)

(52) U.S. Cl.
CPC ...... *G06F 11/2094* (2013.01); *G06F 11/1092* (2013.01); *G06F 11/2033* (2013.01); *G06F 2201/85* (2013.01)

(58) Field of Classification Search
CPC ............ G06F 11/2094; G06F 11/1092; G06F 11/2033; G06F 11/1008; G06F 11/1084; G06F 11/1088; G06F 11/1658; G06F 11/1662; G06F 11/2023; G06F 11/2025; G06F 11/2046; G06F 11/2048; G06F 11/1471; G06F 11/2035; G06F 11/3034; G06F 11/3433; G06F 11/3485; G06F 2201/85; G06F 2201/86; G06F 2201/87
See application file for complete search history.

(56) References Cited

U.S. PATENT DOCUMENTS

| 5,271,012 | A | 12/1993 | Blaum et al. |
|---|---|---|---|
| 6,487,636 | B1 | 11/2002 | Dolphin et al. |
| 7,447,839 | B2 * | 11/2008 | Uppala ............... G06F 11/1052 714/E11.05 |
| 7,661,020 | B1 | 2/2010 | Coatney |
| 7,681,072 | B1 | 3/2010 | Gibson et al. |
| 7,793,146 | B1 | 9/2010 | Gibson et al. |
| 7,877,511 | B1 | 1/2011 | Berger et al. |

(Continued)

FOREIGN PATENT DOCUMENTS

WO    2015/116483    8/2015

OTHER PUBLICATIONS

Int'l Search Report and Written Opinion Appln No. PCT/IB2016/001177 dated Dec. 2, 2016.

(Continued)

*Primary Examiner* — Anthony J Amoroso
(74) *Attorney, Agent, or Firm* — McAndrews Held & Malloy, Ltd.

(57) ABSTRACT

Methods and systems are provided for rapid failure recovery for a distributed storage system for failures by one or more nodes.

20 Claims, 6 Drawing Sheets

(56) References Cited

U.S. PATENT DOCUMENTS

| | | | |
|---|---|---|---|
| 8,347,010 B1 | 1/2013 | Radovanovic | |
| 8,645,749 B2 | 2/2014 | Reche | |
| 8,918,478 B2 | 12/2014 | Ozzie et al. | |
| 9,087,012 B1 | 7/2015 | Hayes et al. | |
| 9,448,735 B1 | 9/2016 | Proulx et al. | |
| 9,448,887 B1 | 9/2016 | Ben Dayan et al. | |
| 9,535,790 B2* | 1/2017 | Schirripa | G06F 11/1464 |
| 9,747,162 B2 | 8/2017 | Ben Dayan et al. | |
| 2002/0191311 A1* | 12/2002 | Ulrich | G06F 16/10 707/E17.01 |
| 2003/0115218 A1 | 6/2003 | Bobbitt et al. | |
| 2004/0098415 A1 | 5/2004 | Bone et al. | |
| 2004/0153481 A1* | 8/2004 | Talluri | G06F 3/067 |
| 2005/0289152 A1 | 12/2005 | Earl et al. | |
| 2007/0061542 A1* | 3/2007 | Uppala | G06F 11/1052 714/E11.05 |
| 2007/0143261 A1 | 6/2007 | Uppala | |
| 2007/0143311 A1 | 6/2007 | Uppala | |
| 2009/0119541 A1 | 5/2009 | Inoue et al. | |
| 2010/0199125 A1 | 8/2010 | Reche | |
| 2011/0213994 A1 | 9/2011 | Thereska et al. | |
| 2012/0047339 A1* | 2/2012 | Decasper | G06F 11/1076 713/193 |
| 2012/0210095 A1 | 8/2012 | Nellans et al. | |
| 2014/0089580 A1* | 3/2014 | Yochai | G06F 3/162 711/114 |
| 2014/0244897 A1 | 8/2014 | Goss et al. | |
| 2014/0281280 A1 | 9/2014 | Goss et al. | |
| 2015/0248366 A1 | 9/2015 | Bergsten et al. | |
| 2015/0254088 A1 | 9/2015 | Chou et al. | |
| 2015/0355971 A1* | 12/2015 | Becker-Szendy | G06F 11/008 714/6.24 |
| 2016/0246677 A1 | 8/2016 | Sangamkar et al. | |
| 2016/0259802 A1 | 9/2016 | Sedayao et al. | |
| 2016/0274973 A1* | 9/2016 | Sundaram | G06F 11/1068 |

OTHER PUBLICATIONS

Int'l Preliminary Report on Patentability Appln No. PCT/IB2016/001177 dated Mar. 8, 2018.

Int'l Search Report and Written Opinion Appln No. PCT/IB2016/000996 dated Oct. 20, 2016.

Int'l Preliminary Report on Patentability Appln No. PCT/IB2016/000996 dated Jan. 2, 2018.

Extended European Search Report Appln No. 16817312.8-1217 dated Oct. 25, 2018.

Int'l Search Report and Written Opinion Appln No. PCT/IB2018/001255 dated Mar. 22, 2019 (13 pgs).

Int'l Preliminary Report on Patentability Appln No. PCT/IB2018/001255 dated May 28, 2020.

Extended European Search Report Appln No. 18875963.3 dated Jul. 9, 2021.

* cited by examiner

METHODS AND SYSTEMS FOR RAPID FAILURE RECOVERY FOR A DISTRIBUTED STORAGE SYSTEM

PRIORITY CLAIM

This application is a continuation of U.S. patent application Ser. No. 16/121,491, filed Sep. 4, 2018, which claims priority to the following application, which is hereby incorporated herein by reference U.S. provisional patent application 62/585,166 filed on Nov. 13, 2017. The aforementioned documents are hereby incorporated herein by reference in their entirety.

BACKGROUND

Limitations and disadvantages of conventional approaches to data storage will become apparent to one of skill in the art, through comparison of such approaches with some aspects of the present method and system set forth in the remainder of this disclosure with reference to the drawings.

INCORPORATION BY REFERENCE

U.S. patent application Ser. No. 15/243,519 titled "Distributed Erasure Coded Virtual File System" is hereby incorporated herein by reference in its entirety.

BRIEF SUMMARY

Methods and systems are provided for rapid failure recovery in a distributed storage system substantially as illustrated by and/or described in connection with at least one of the figures, as set forth more completely in the claims.

DETAILED DESCRIPTION

Traditionally, filesystems use a centralized control over the metadata structure (e.g., directories, files, attributes, file contents). If a local filesystem is accessible from a single server and that server fails, the filesystem's data may be lost if as there is no further protection. To add protection, some filesystems (e.g., as provided by NetApp) have used one or more pairs of controllers in an active-passive manner to replicate the metadata across two or more computers. Other solutions have used multiple metadata servers in a clustered way (e.g., as provided by IBM GPFS, Dell EMC Isilon, Lustre, etc.). However, because the number of metadata servers in a traditional clustered system is limited to small numbers, such systems are unable to scale.

The systems in this disclosure are applicable to small clusters and can also scale to many, many thousands of nodes. An example embodiment is discussed regarding non-volatile memory (NVM), for example, flash memory that comes in the form of a solid-state drive (SSD). The NVM may be divided into 4 kB "blocks" and 128 MB "chunks." "Extents" may be stored in volatile memory such as, for example, RAM, for fast access, and may be backed up by NVM storage as well. An extent may store pointers for blocks, e.g., 256 pointers to 1 MB of data stored in blocks. In other embodiments, larger or smaller memory divisions may also be used. Metadata functionality in this disclosure may be effectively spread across many servers. For example, in cases of "hot spots" where a large load is targeted at a specific portion of the filesystem's namespace, this load can be distributed across a plurality of nodes.

Figure 1:
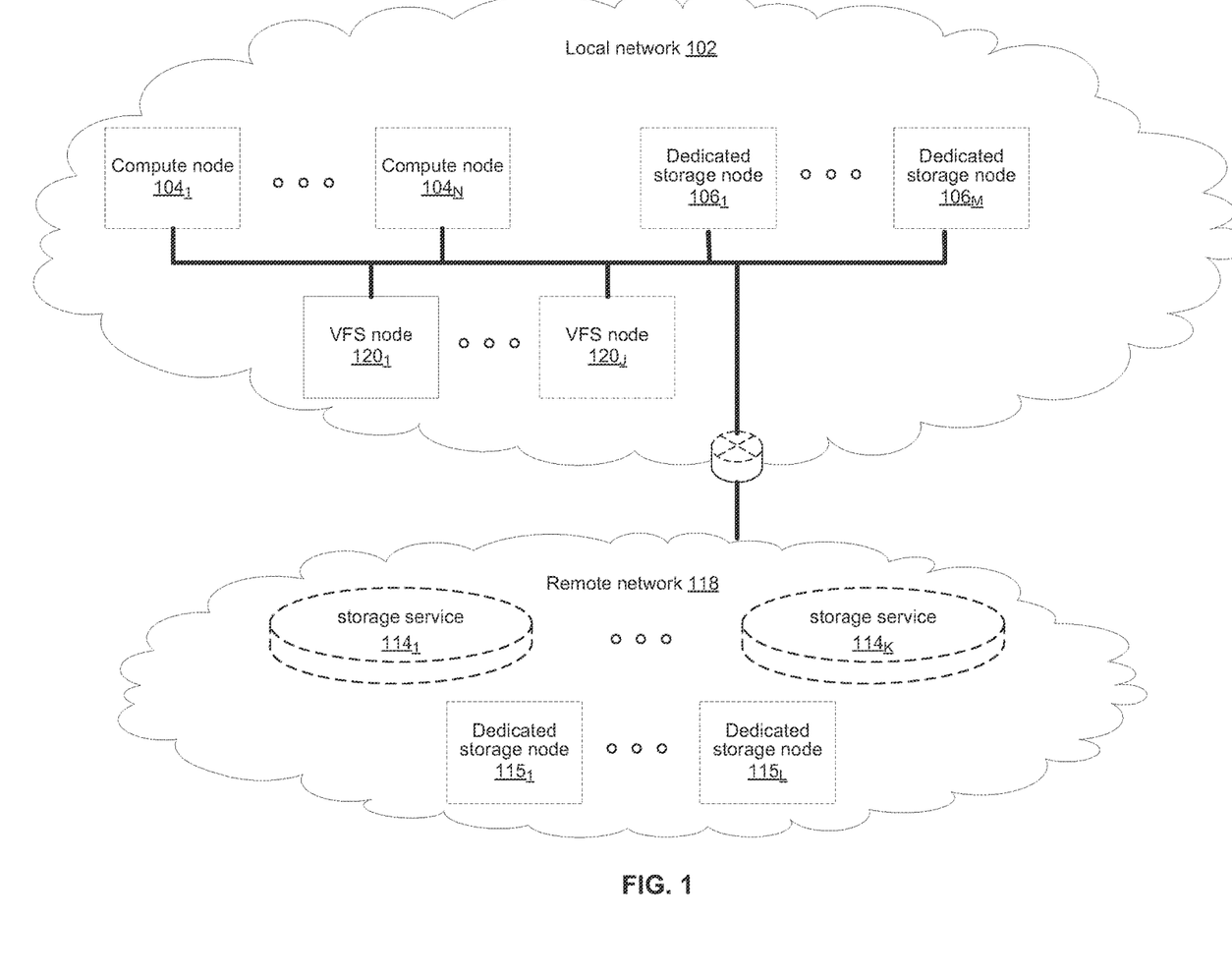
FIG. 1 illustrates various example configurations of a virtual file system in accordance with aspects of this disclosure.

FIG. 1 illustrates various example configurations of a virtual file system (VFS) in accordance with aspects of this disclosure. Shown in FIG. 1 is a local area network (LAN) 102 comprising one or more VFS nodes 120 (indexed by integers from 1 to J, for $j \geq 1$), and optionally comprising (indicated by dashed lines): one or more dedicated storage nodes 106 (indexed by integers from 1 to M, for $M \geq 1$), one or more compute nodes 104 (indexed by integers from 1 to N, for $N \geq 1$), and/or an edge router that connects the LAN 102 to a remote network 118. The remote network 118 optionally comprises one or more storage services 114 (indexed by integers from 1 to K, for $K \geq 1$), and/or one or more dedicated storage nodes 115 (indexed by integers from 1 to L, for $L \geq 1$).

Each VFS node $120_j$ (j an integer, where $1 \leq j \leq J$) is a networked computing device (e.g., a server, personal computer, or the like) that comprises circuitry for running VFS processes and, optionally, client processes (either directly on an operating system of the device $104_n$ and/or in one or more virtual machines running in the device $104_n$).

The compute nodes 104 are networked devices that may run a VFS frontend without a VFS backend. A compute node 104 may run VFS frontend by taking an SR-IOV into the NIC and consuming a complete processor core. Alternatively, the compute node 104 may run the VFS frontend by routing the networking through a Linux kernel networking stack and using kernel process scheduling, thus not having the requirement of a full core. This is useful if a user does not want to allocate a complete core for the VFS or if the networking hardware is incompatible with the VFS requirements.

Figure 2:
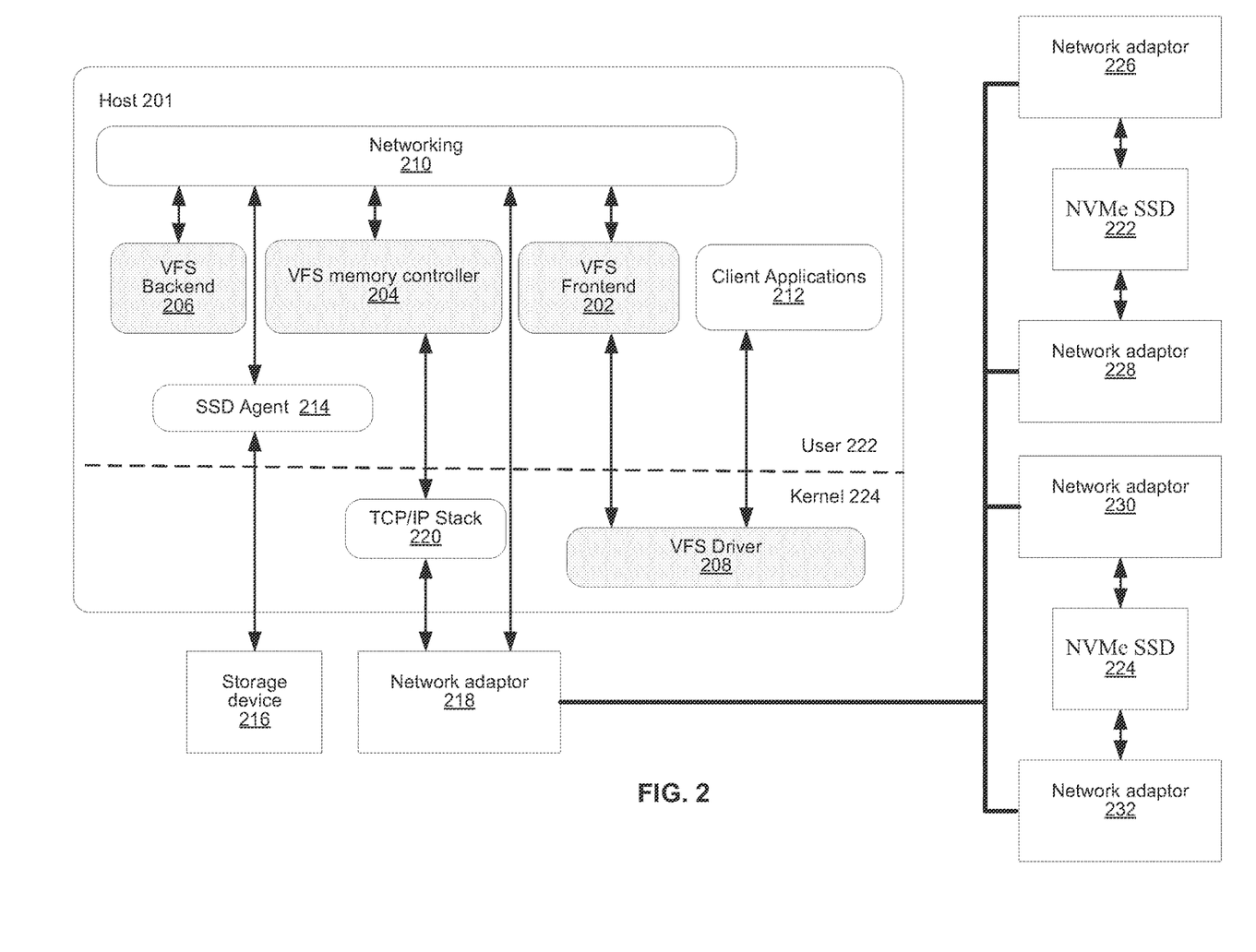
FIG. 2 illustrates an example configuration of a virtual file system node in accordance with aspects of this disclosure.

FIG. 2 illustrates an example configuration of a VFS node in accordance with aspects of this disclosure. A VFS node comprises a VFS frontend 202 and driver 208, a VFS memory controller 204, a VFS backend 206, and a VFS SSD agent 214. As used in this disclosure, a "VFS process" is a process that implements one or more of: the VFS frontend 202, the VFS memory controller 204, the VFS backend 206, and the VFS SSD agent 214. Thus, in an example implementation, resources (e.g., processing and memory resources) of the VFS node may be shared among client processes and VFS processes. The processes of the VFS may be configured to demand relatively small amounts of the resources to minimize the impact on the performance of the client applications. The VFS frontend 202, the VFS memory controller 204, and/or the VFS backend 206 and/or the VFS SSD agent 214 may run on a processor of the host 201 or on a processor of the network adaptor 218. For a multi-core processor, different VFS process may run on different cores, and may run a different subset of the services. From the perspective of the client process(es) 212, the interface with the virtual file system is independent of the particular physical machine(s) on which the VFS process(es) are running. Client processes only require driver 208 and frontend 202 to be present in order to serve them.

The VFS node may be implemented as a single tenant server (e.g., bare-metal) running directly on an operating system or as a virtual machine (VM) and/or container (e.g., a Linux container (LXC)) within a bare-metal server. The VFS may run within an LXC container as a VM environment. Thus, inside the VM, the only thing that may run is the LXC container comprising the VFS. In a classic bare-metal environment, there are user-space applications and the VFS runs in an LXC container. If the server is running other containerized applications, the VFS may run inside an LXC container that is outside the management scope of the container deployment environment (e.g. Docker).

The VFS node may be serviced by an operating system and/or a virtual machine monitor (VMM) (e.g., a hypervisor). The VMM may be used to create and run the VFS node on a host 201. Multiple cores may reside inside the single LXC container running the VFS, and the VFS may run on a single host 201 using a single Linux kernel. Therefore, a single host 201 may comprise multiple VFS frontends 202, multiple VFS memory controllers 204, multiple VFS backends 206, and/or one or more VFS drivers 208. A VFS driver 208 may run in kernel space outside the scope of the LXC container.

A single root input/output virtualization (SR-IOV) PCIe virtual function may be used to run the networking stack 210 in user space 222. SR-IOV allows the isolation of PCI Express, such that a single physical PCI Express can be shared on a virtual environment and different virtual functions may be offered to different virtual components on a single physical server machine. The I/O stack 210 enables the VFS node to bypasses the standard TCP/IP stack 220 and communicate directly with the network adapter 218. A Portable Operating System Interface for uniX (POSIX) VFS functionality may be provided through lockless queues to the VFS driver 208. SR-IOV or full PCIe physical function address may also be used to run non-volatile memory express (NVMe) driver 214 in user space 222, thus bypassing the Linux IO stack completely. NVMe may be used to access non-volatile storage media 216 attached via a PCI Express (PCIe) bus. The non-volatile storage media 220 may be, for example, flash memory that comes in the form of a solid-state drive (SSD) or Storage Class Memory (SCM) that may come in the form of an SSD or a memory module (DIMM). Other example may include storage class memory technologies such as 3D-XPoint.

The SSD may be implemented as a networked device by coupling the physical SSD 216 with the SSD agent 214 and networking 210. Alternatively, the SSD may be implemented as a network-attached NVMe SSD 222 or 224 by using a network protocol such as NVMe-oF (NVMe over Fabrics). NVMe-oF may allow access to the NVMe device using redundant network links, thereby providing a higher level or resiliency. Network adapters 226, 228, 230 and 232 may comprise hardware acceleration for connection to the NVMe SSD 222 and 224 to transform them into networked NVMe-oF devices without the use of a server. The NVMe SSDs 222 and 224 may each comprise two physical ports, and all the data may be accessed through either of these ports.

Each client process/application 212 may run directly on an operating system or may run in a virtual machine and/or container serviced by the operating system and/or hypervisor. A client process 212 may read data from storage and/or write data to storage in the course of performing its primary function. The primary function of a client process 212, however, is not storage-related (i.e., the process is only concerned that its data is reliably stored and is retrievable when needed, and not concerned with where, when, or how the data is stored). Example applications which give rise to such processes include: email servers, web servers, office productivity applications, customer relationship management (CRM), animated video rendering, genomics calculation, chip design, software builds, and enterprise resource planning (ERP).

A client application 212 may make a system call to the kernel 224 which communicates with the VFS driver 208. The VFS driver 208 puts a corresponding request on a queue of the VFS frontend 202. If several VFS frontends exist, the driver may load balance accesses to the different frontends, making sure a single file/directory is always accessed via the same frontend. This may be done by "sharding" the frontend based on the ID of the file or directory. The VFS frontend 202 provides an interface for routing file system requests to an appropriate VFS backend based on the bucket that is responsible for that operation. The appropriate VFS backend may be on the same host or it may be on another host.

The VFS backend 206 hosts several buckets, each one of them services the file system requests that it receives and carries out tasks to otherwise manage the virtual file system (e.g., load balancing, journaling, maintaining metadata, caching, moving of data between tiers, removing stale data, correcting corrupted data, etc.)

The VFS SSD agent 214 handles interactions with a respective storage device 216. This may include, for example, translating addresses, and generating the commands that are issued to the storage device (e.g., on a SATA, SAS, PCIe, or other suitable bus). Thus, the VFS SSD agent 214 operates as an intermediary between a storage device 216 and the VFS backend 206 of the virtual file system. The SSD agent 214 could also communicate with a standard network storage device supporting a standard protocol such as NVMe-oF (NVMe over Fabrics).

Figure 3:
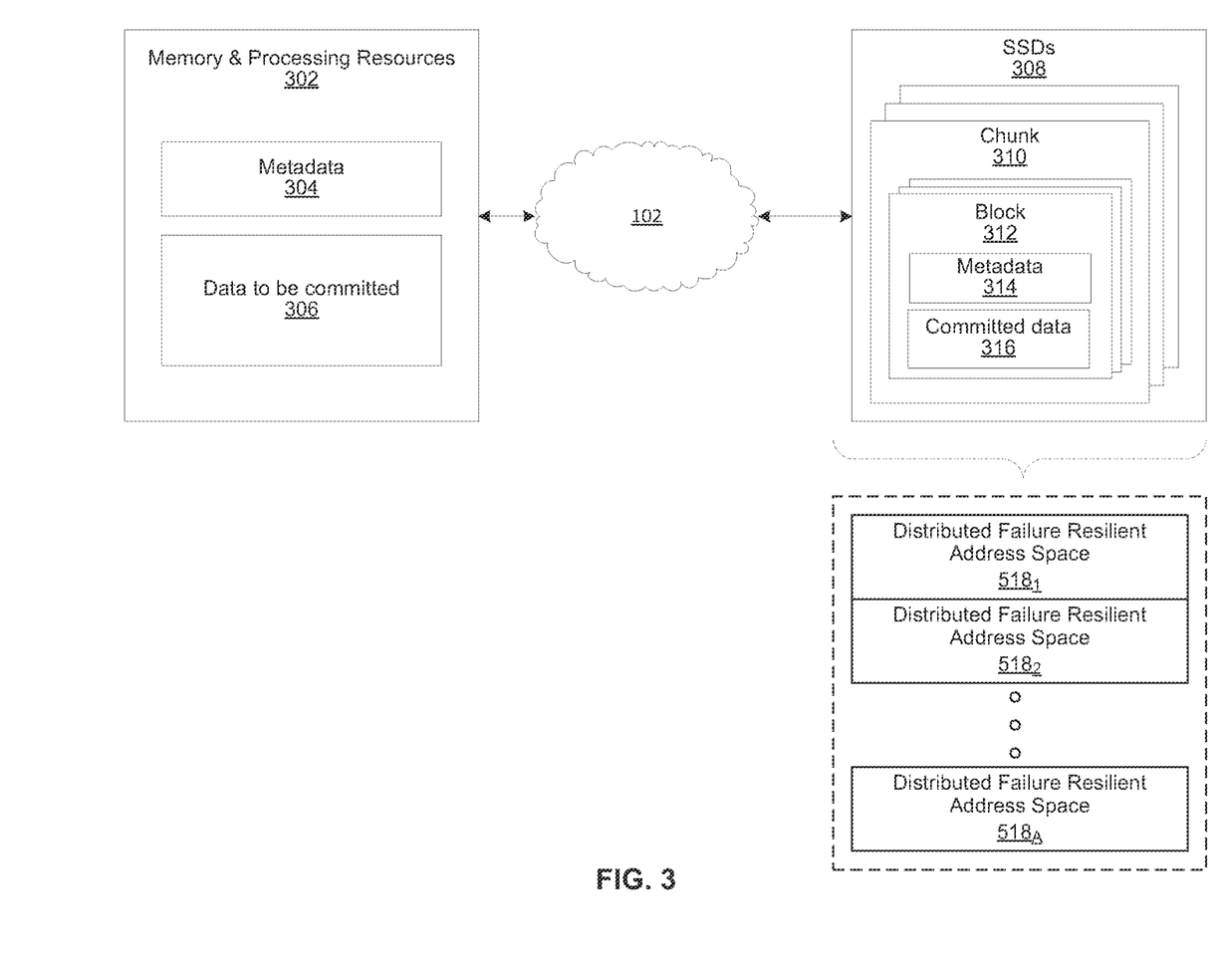
FIG. 3 illustrates another representation of a virtual file system in accordance with an example implementation of this disclosure.

FIG. 3 illustrates another representation of a virtual file system in accordance with an example implementation of this disclosure. In FIG. 3, the element 302 represents memory resources (e.g., DRAM and/or other short-term memory) and processing (e.g., x86 processor(s), ARM processor(s), NICs, ASICs, FPGAs, and/or the like) resources of various node(s) (compute, storage, and/or VFS) on which resides a virtual file system, such as described regarding FIG. 2 above. The element 308 represents the one or more physical storage devices 216 which provide the long term storage of the virtual file system.

As shown in FIG. 3, the physical storage is organized into a plurality of distributed failure resilient address spaces (DFRASs) 518. Each of which comprises a plurality of chunks 310, which in turn comprises a plurality of blocks 312. The organization of blocks 312 into chunks 310 is only a convenience in some implementations and may not be done in all implementations. Each block 312 stores committed data 316 (which may take on various states, discussed below) and/or metadata 314 that describes or references committed data 316.

The organization of the storage 308 into a plurality of DFRASs enables high performance parallel commits from many—perhaps all—of the nodes of the virtual file system (e.g., all nodes $104_1$-$104_N$, $106_1$-$106_M$, and $120_1$-$120_J$ of FIG. 1 may perform concurrent commits in parallel). In an example implementation, each of the nodes of the virtual file system may own a respective one or more of the plurality of DFRAS and have exclusive read/commit access to the DFRASs that it owns.

Each bucket owns a DFRAS, and thus does not need to coordinate with any other node when writing to it. Each bucket may build stripes across many different chunks on many different SSDs, thus each bucket with its DFRAS can choose what "chunk stripe" to write to currently based on many parameters, and there is no coordination required in order to do so once the chunks are allocated to that bucket. All buckets can effectively write to all SSDs without any need to coordinate.

Each DFRAS being owned and accessible by only its owner bucket that runs on a specific node allows each of the nodes of the VFS to control a portion of the storage 308 without having to coordinate with any other nodes (except during [re] assignment of the buckets holding the DFRASs during initialization or after a node failure, for example, which may be performed asynchronously to actual reads/commits to storage 308). Thus, in such an implementation, each node may read/commit to its buckets' DFRASs independently of what the other nodes are doing, with no requirement to reach any consensus when reading and committing to storage 308. Furthermore, in the event of a failure of a particular node, the fact the particular node owns a plurality of buckets permits more intelligent and efficient redistribution of its workload to other nodes (rather the whole workload having to be assigned to a single node, which may create a "hot spot"). In this regard, in some implementations the number of buckets may be large relative to the number of nodes in the system such that any one bucket may be a relatively small load to place on another node. This permits fine grained redistribution of the load of a failed node according to the capabilities and capacity of the other nodes (e.g., nodes with more capabilities and capacity may be given a higher percentage of the failed nodes buckets).

To permit such operation, metadata may be maintained that maps each bucket to its current owning node such that reads and commits to storage 308 can be redirected to the appropriate node.

Load distribution is possible because the entire filesystem metadata space (e.g., directory, file attributes, content range in the file, etc.) can be broken (e.g., chopped or sharded) into small, uniform pieces (e.g., "shards"). For example, a large system with 30 k servers could chop the metadata space into 128 k or 256 k shards.

Each such metadata shard may be maintained in a "bucket." Each VFS node may have responsibility over several buckets. When a bucket is serving metadata shards on a given backend, the bucket is considered "active" or the "leader" of that bucket. Typically, there are many more buckets than VFS nodes. For example, a small system with 6 nodes could have 120 buckets, and a larger system with 1,000 nodes could have 8 k buckets.

Each bucket may be active on a small set of nodes, typically 5 nodes that form a penta-group for that bucket. The cluster configuration keeps all participating nodes up-to-date regarding the penta-group assignment for each bucket.

Each penta-group monitors itself. For example, if the cluster has 10 k servers, and each server has 6 buckets, each server will only need to talk with 30 different servers to maintain the status of its buckets (6 buckets will have 6 penta-groups, so 6*5=30). This is a much smaller number than if a centralized entity had to monitor all nodes and keep a cluster-wide state. The use of penta-groups allows performance to scale with bigger clusters, as nodes do not perform more work when the cluster size increases. This could pose a disadvantage that in a "dumb" mode a small cluster could actually generate more communication than there are physical nodes, but this disadvantage is overcome by sending just a single heartbeat between two servers with all the buckets they share (as the cluster grows this will change to just one bucket, but if you have a small 5 server cluster then it will just include all the buckets in all messages and each server will just talk with the other 4). The penta-groups may decide (i.e., reach consensus) using an algorithm that resembles the Raft consensus algorithm.

Each bucket may have a group of compute nodes that can run it. For example, five VFS nodes can run one bucket. However, only one of the nodes in the group is the controller/leader at any given moment. Further, no two buckets share the same group, for large enough clusters. If there are only 5 or 6 nodes in the cluster, most buckets may share backends. In a reasonably large cluster there many distinct node groups. For example, with 26 nodes, there are more than 64,000

$$\left(\frac{26!}{5!*(26-5)!}\right)$$

possible five-node groups (i.e., penta-groups).

All nodes in a group know and agree (i.e., reach consensus) on which node is the actual active controller (i.e., leader) of that bucket. A node accessing the bucket may remember ("cache") the last node that was the leader for that bucket out of the (e.g., five) members of a group. If it accesses the bucket leader, the bucket leader performs the requested operation. If it accesses a node that is not the current leader, that node indicates the leader to "redirect" the access. If there is a timeout accessing the cached leader node, the contacting node may try a different node of the same penta-group. All the nodes in the cluster share common "configuration" of the cluster, which allows the nodes to know which server may run each bucket.

Each bucket may have a load/usage value that indicates how heavily the bucket is being used by applications running on the filesystem. For example, a server node with 11 lightly used buckets may receive another bucket of metadata to run before a server with 9 heavily used buckets, even though there will be an imbalance in the number of buckets used. Load value may be determined according to average response latencies, number of concurrently run operations, memory consumed or other metrics.

Redistribution may also occur even when a VFS node does not fail. If the system identifies that one node is busier than the others based on the tracked load metrics, the system can move (i.e., "fail over") one of its buckets to another server that is less busy. However, before actually relocating a bucket to a different host, load balancing may be achieved by diverting writes and reads. Because each write may end up on a different group of nodes, decided by the DFRAS, a node with a higher load may not be selected to be in a stripe to which data is being written. The system may also opt to not serve reads from a highly loaded node. For example, a "degraded mode read" may be performed, wherein a block in the highly loaded node is reconstructed from the other blocks of the same stripe. A degraded mode read is a read that is performed via the rest of the nodes in the same stripe, and the data is reconstructed via the failure protection. A degraded mode read may be performed when the read latency is too high, as the initiator of the read may assume that that node is down. If the load is high enough to create higher read latencies, the cluster may revert to reading that data from the other nodes and reconstructing the needed data using the degraded mode read.

Each bucket manages its own distributed erasure coding instance (i.e., DFRAS 518) and does not need to cooperate with other buckets to perform read or write operations. There are potentially thousands of concurrent, distributed erasure coding instances working concurrently, each for the different bucket. This is an integral part of scaling performance, as it effectively allows any large filesystem to be divided into independent pieces that do not need to be coordinated, thus providing high performance regardless of the scale.

Each bucket handles all the file systems operations that fall into its shard. For example, the directory structure, file attributes, and file data ranges will fall into a particular bucket's jurisdiction.

An operation done from any frontend starts by finding out what bucket owns that operation. Then the backend leader, and the node, for that bucket is determined. This determination may be performed by trying the last-known leader. If the last-known leader is not the current leader, that node may know which node is the current leader. If the last-known leader is not part of the bucket's penta-group anymore, that backend will let the front end know that it should go back to the configuration to find a member of the bucket's penta-group. The distribution of operations allows complex operations to be handled by a plurality of servers, rather than by a single computer in a standard system.

If the cluster of size is small (e.g., 5) and penta-groups are used, there will be buckets that share the same group. As the cluster size grows, buckets are redistributed such that no two groups are identical.

A protection mechanism may be used to protect the data from occasional server failures. Depending on the protection level, the protection mechanism may be able to withstand one or more server failures to allow for a quick recovery. Some example recovery processes from server failures are described below. A general process may involve, for example, rebuilding only data without read cache, and rebuilding the least protected data pieces first. One aspect of recovering from failure may involve rebuilding data efficiently and allowing I/O to run while the server is out of service. Another aspect of recovering from failure may involve quickly recovering metadata ownership such that the buckets can be used to continue writing.

When protecting in a +2 mode, data may be recovered even when two servers are in a concurrent failing mode. When protecting in a +4 mode, there may be up to four concurrent servers that are in a concurrent failing mode while still allowing full recovery. When failure is detected, the stripe(s) with the most blocks affected are fixed, followed by the next most affected, etc. When the most affected stripes are fixed then the system may be able to tolerate another server failure, at which point the presently most affected stripe(s) are fixed. Accordingly, the quick response to fix a stripe may minimize down time for the affected servers. Additionally, since the data and the metadata to access the data are spread out over all the servers available, a majority of the system will still be accessible for reads and writes.

Figure 4:
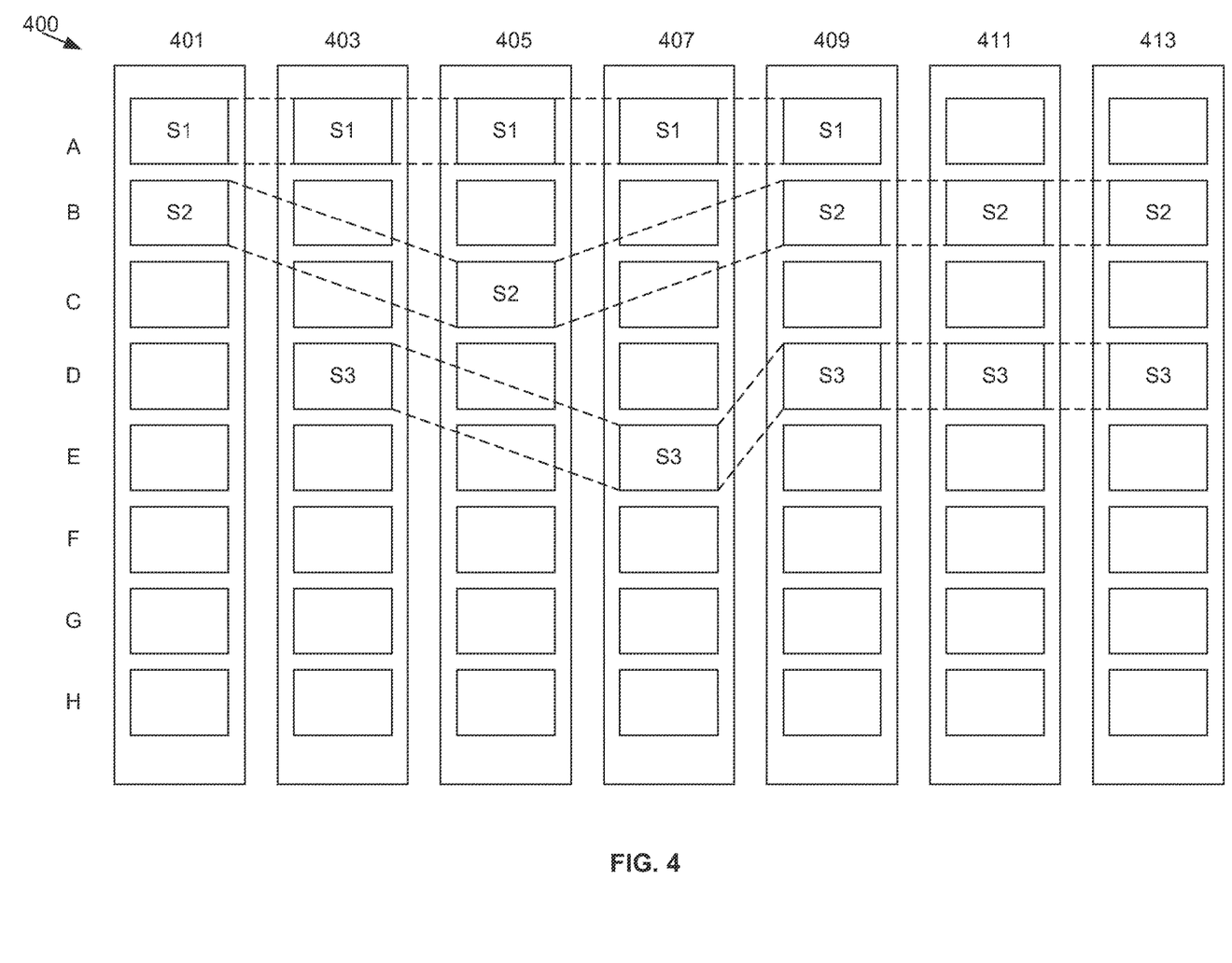
FIG. 4 illustrates a simplified example of a relationship between the number of nodes and the number of pentagroups in accordance with an example implementation of this disclosure.

FIG. 4 illustrates a simplified example of a relationship between the number of nodes and the number of pentagroups in accordance with an example implementation of this disclosure. Referring to FIG. 4, there is shown a simplified example system 400 comprising seven servers 401-413, where each server has a single SSD with eight blocks. There are also shown three stripes that span across five servers where the five server stripe may be referred to as a pentagroup.

It can be seen in FIG. 4 that there is quite a bit of overlap of the pentagroups (stripes) at any given server. For the three stripe example, six servers have two stripes and one server has three stripes. For this example of seven nodes described in FIG. 4, there are a total of 21 different pentagroups. This is calculated as explained above: number of pentagroups= [(nodes)!/((5!)*(nodes−5))]. However, increasing the number of nodes to 28 increases the number of possible pentagroups to over 98,000.

Therefore, by going from one SSD per server (7 nodes) to 4 SSDs per server (28 nodes), the number of pentagroups increases from 21 to 98,000. Accordingly, when the stripes are assigned to a pentagroup to minimize overlap between pentagroups for a server, it can be seen that the probability of a large number of stripes being affected by a single server is extremely small.

Also, the four SSDs per server may be located independently of the server and from each other so that at least for power and/or network access, when one SSD is inaccessible due to power outage or network access being down, the other three SSDs are not affected. Even if one server goes down removing access to four SSDs, there are still over 42,000 pentagroups available. Accordingly, it can be seen that as the number of SSDs controlled by a server goes up, the number of pentagroups affected by a single SSD going down decreases drastically.

Therefore, when a server goes down, there may be some number of pentagroups that are affected because one of their blocks is on that server. When a second server goes down so that there are two failed servers at the same time, the number of pentagroups that are affected by both servers will be much smaller than those affected by one server. Similarly, when there are three failed servers, the number of pentagroups affected by all three servers is much smaller than those affected by any two of those three failed servers. Below are some example scenarios of recovering from failed servers.

Figure 5:
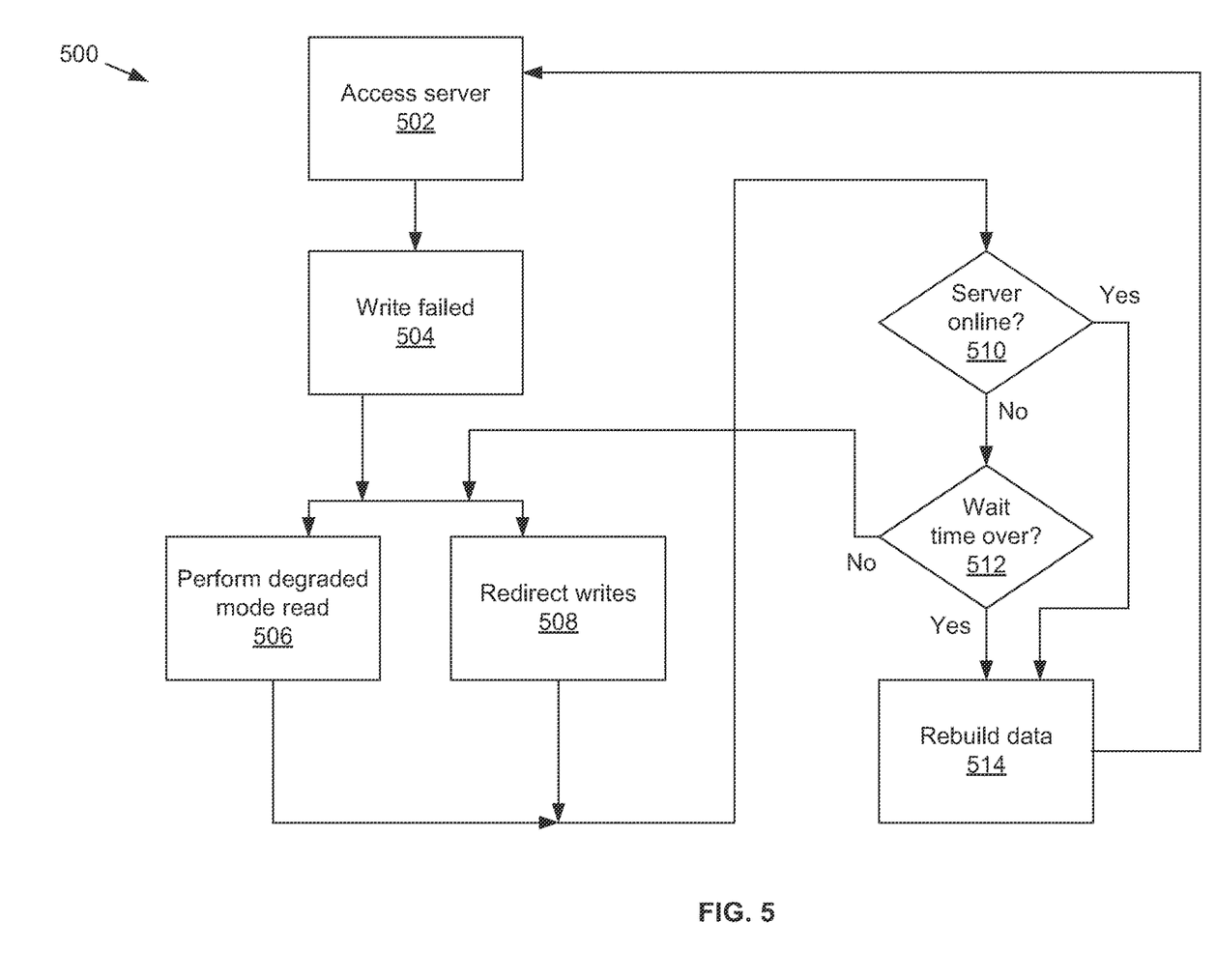
FIG. 5 illustrates a flow diagram of an example method of recovering from a single node failure, in accordance with an example implementation of this disclosure.

FIG. 5 illustrates a flow diagram of an example method of recovering from a single node failure, in accordance with an example implementation of this disclosure. Referring to FIG. 5, there is shown a flow diagram 500. At block 502, the system may access data for a server. At block 504, the system may detect that the server is inaccessible after one attempted write to the failed server. The server itself may be down or the path to the server may be compromised.

At block 506 all writes to the inaccessible server will be stopped, and the system is set up to divert writes to the other servers that are associated with a stripe to which the write was intended. At block 508, the system may automatically perform a degraded mode read process by reading from all the stripe data blocks in parallel from the other servers to recreates that missing block. Accordingly, there may be very little degradation to data access performance even if there is a request for data from the missing block in the inaccessible server. The operations of blocks 506 and 508 are shown to be substantially parallel. However, various embodiments may implement that as shown or prioritize one of the blocks over the other.

At block 510, there may be checks to see if the inaccessible server has come back online. For example, a message may be received from the formerly inaccessible server that it is online and ready for read/write requests. If so, then the system may go to block 514 to rebuild any data that may be needed to bring the formerly inaccessible server up to date. For example, this may entail moving data that were written to other server(s) because the server was inaccessible to the formerly inaccessible server.

If the inaccessible server has not come back online, then the system may check at block 512 to see if a wait time has elapsed since the detection of the inaccessible server. Since the system is designed to run on multiple application servers where there is redundant protection for multiple outages, the rebuild process of the missing block may not need to start right away. The inaccessible server may not be used for a pre-determined wait time such as, for example, 15 minutes. During that time, the writes continue to be diverted to other servers and reads are performed from the recreated block.

If the server remains inaccessible beyond the wait time, then at block 514 the data in the inaccessible server may be rebuilt and moved to other servers. This wait time may be to allow a temporary outage to pass. For example, the outage may have been due to a brown-out, and the server may have recovered. The wait time may be changed depending on various parameters such as, for example, the amount of data access to/from the servers and/or a stripe, known outages external to the system, etc.

Once the previously inaccessible server comes back online at 510, the data stored on that server may be read and verified as valid by using the data and the metadata that includes the registry and the journals. Accordingly, valid data need not be rebuilt. The data that had been diverted to other servers may be moved back to the present data, or may be left as is. This may be design and/or implementation dependent.

Therefore, it may be that most of the time when a server goes down, little to no additional data rebuilding may need to be done, unlike other storage systems at present. However, there may be rare occasions where the data stored in the NVM may have corrupt data.

To rebuild data when just one server is down, the affected data from the down server may be moved to the other servers. Since data are referred to by metadata in buckets, the buckets that were originally on that server may have already been migrated to other servers to support metadata functionality very quickly. For example, the migration may happen much quicker than the wait time of, for example, 15 minutes. The migration time may be a matter of, for example, seconds. This may be performed by each bucket, which may have a distributed erasure coding system (DECS) that can go over all the stripes that it manages to find the stripe portions that are stored on the server that is down. The corrupt stripe portion for a bucket may then be rebuilt from all the remaining servers, and the rebuilding may be done concurrently for all the stripes that are affected by the server that is down.

Since a server may have a limitation on how much networking and local SSD throughput is available for the rebuild process, the amount of rebuilding may be minimized to what is necessary allow the servers that are rebuilding the missing data to perform optimally. Accordingly, only portions of the stripes that are actually stored on the server that is down are rebuilt. If no data was stored because a block is either free or in an object storage read cache, then that block may be marked as unused and no rebuild needs to happen. As explained above, the data in a read cache may have already been rebuilt during the wait time.

Once all DECS have rebuilt all stripes that were affected by the server that is down, the rebuild is over. Accordingly, in a rebuild, another available server is picked to join a stripe, the missing block is recalculated, and that block may be written to the new server to complete the stripe. All other blocks for the bucket need not be affected.

Figure 6:
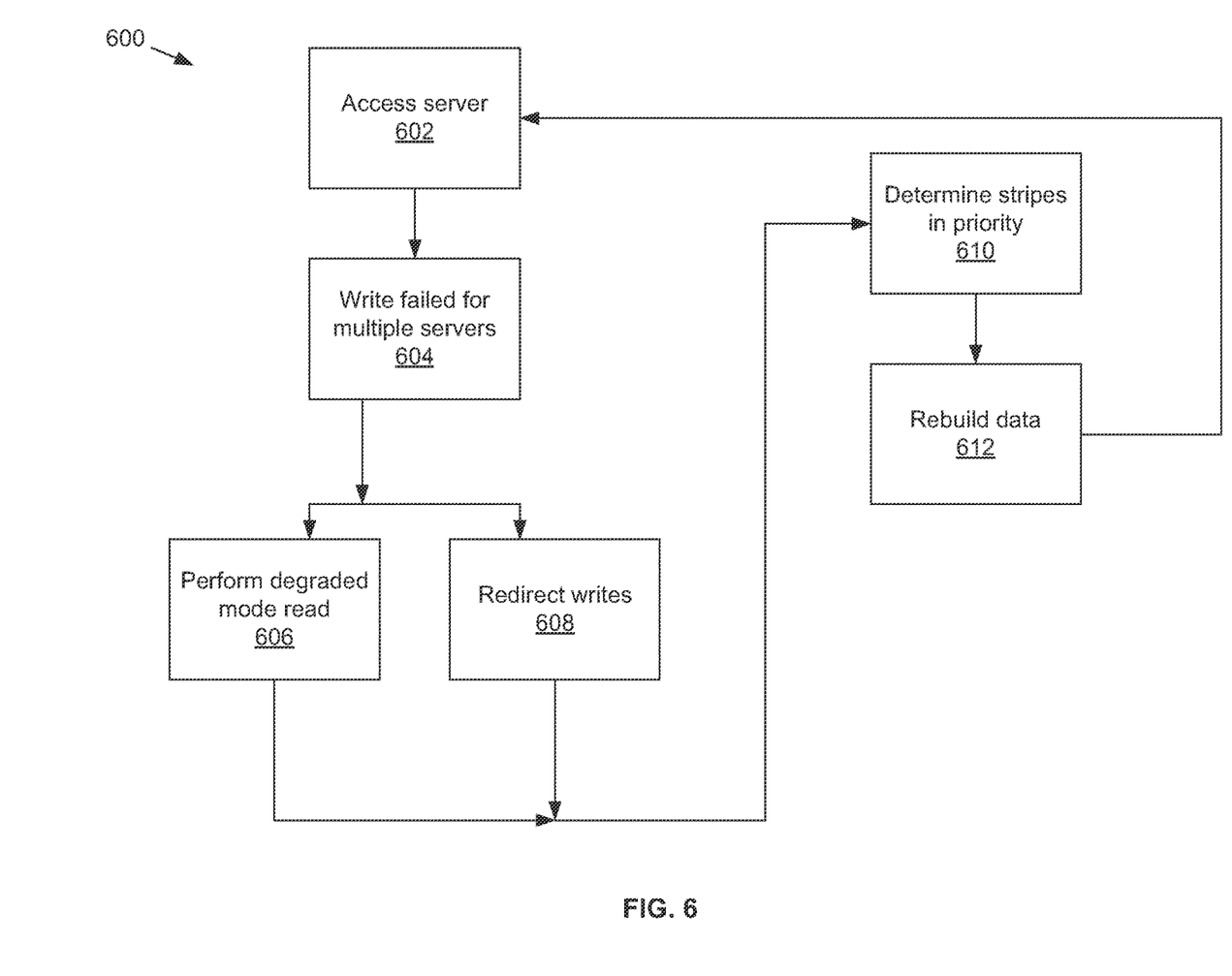
FIG. 6 illustrates a flow diagram of an example method of recovering from a multiple node failure, in accordance with an example implementation of this disclosure.

FIG. 6 illustrates a flow diagram of an example method of recovering from a multiple node failure, in accordance with an example implementation of this disclosure. Failures of multiple servers may be treated with priority for different levels of affected stripes. For ease of explanation, a +2 protection will be described below. It should be noted that +4, or +n where n>1 may be treated in a similar manner.

Referring to FIG. 6, there is shown the flow diagram 600 that may be generally similar to the flow diagram 500. Block 602 may be similar to block 502. At block 604, a determination may be made of multiple server failures. Blocks 606 and 608 may be similar to blocks 506 and 508.

The flow diagram 600 has omitted blocks 510 and 512 for the sake of brevity, but it should be understood that similar operations happen in the flow diagram 600. At block 610, the affected stripes are identified with the most affected stripes having higher priority, and then the next most affected stripes, etc. For example, assuming there are two servers that failed, when the wait time is over and rebuild starts for a server, all the DECSs may examine their stripes to find the stripes that are affected by both servers that have failed.

At block 612 those identified stripes are rebuilt first. This is because if there is another server failure that affects one of these stripes, the blocks on those servers may not be recoverable. After the most affected stripes have been rebuilt, then the next most affected stripes are rebuilt, etc.

As described previously, the stripes are spread out over all the servers to minimize the number of stripes that depend on the same server, or a same set of servers. Accordingly, there may be a smaller number of stripes that are affected by these two servers failing as opposed to the number of stripes that are affected by one of the servers failing. Therefore, rather than try to rebuild each affected stripe, priority is given to the smaller number of stripes that are affected by both of the failed servers. As before, a stripe is affected if a block of data in a server actually holds data rather than being free or is copied to a read cache.

After all the stripes with two actual failures are fixed, then the system may continue to rebuild those stripes that are affected by only one of the two failed servers. The two distinct single-server failures may be rebuilt in parallel, or may be rebuilt in series. This may depend on, for example, design and/or implementation of the system. For example, if it is determined that network traffic is very high in general and/or to the servers for the buckets affected by the failed servers, it may be determined that one failed server may be rebuilt at a time.

If, while both servers are still down and have not been replaced, there is a third server failure, then all the DECS will examine all the stripes and identify those that are affected by two failed servers. For example, this may be any stripe that is affected by the first failed server and the second failed sever, the second failed server and the third failed sever, or the first failed server and the third failed sever. These identified stripes may be rebuilt first, and once those are rebuilt, then rebuild those stripes affected by a single failed server. Accordingly, while there may be three servers that have failed, the system may not actually be endangered.

If one of the failed servers returns online, then there may not be a need to continue rebuilding the data that is stored on that server. However, whether the rebuilding happens may depend on several criteria. For example, the rebuilding may depend on how far along the rebuild is. If the rebuild is almost complete to a certain degree, which may be pre-determined and/or variable depending on recent conditions (e.g., network traffic, local traffic, etc.), the rebuild may keep going. The rebuild may also depend on, for example, the history of the server downtime and/or storage node downtime. If a particular server, parts of the server, or network path to the server has been problematic, it may be more expedient to use a new server until the problems affecting the recently failed server are fixed.

When there is +4 protection, the same thing happens for the first, second, third and fourth failures, and only the fourth failure may be dangerous. If there are stripes affected by all four servers are affected by a fifth failed server, then those stripes affected by the five failed servers may not be rebuildable. However, the present example architecture may alleviate the probability of these kinds of failures by having the various buckets use different servers to reduce the number of stripes that are affected by failed servers. Therefore, when there may be very few stripes that are affected by four failures, all the DECSs may fix the stripes that have 4 holes within, for example, seconds or minutes so that the fifth server failure can happen very quickly and the system may still stay resilient.

To rebuild the stripes, metadata in the affected buckets may first be recovered. While the rebuilding disclosed above describes the rebuild process that kicks in, for example, 15 minutes after a failure, the bucket recovery process may need to happen more quickly as all reads/writes to the ranges of files (or directory operations, etc.) handled by the affected buckets may stall until there is a leader for each of the affected buckets.

The system may determine how many buckets were running on that failed server, and identify the best servers to accept these buckets from a load balancing perspective. If the system is large enough, then just one bucket may need to be moved to each receiving server, but on smaller systems a server may need to receive more than one bucket.

The system may keep track of a window of activity per bucket, and may try to distribute the buckets to servers that are less busy, or if grouping buckets together, group the buckets that are currently less loaded. This may alleviate a need to perform load-balancing soon after the rebuilding.

The receiving servers may perform a procedure to get the buckets up to date in memory as soon as possible so that the servers may be able to start serving requests. This may entail, for example, combining the registries and journals to get coherent operations that will work well during rebuilding for failed servers and/or load balancing.

The procedure may comprise delaying writes of the registry data to the NVM. This may be, for example, to reduce system delays from write latency while storing the registry data and also to reduce the number of writes to the NVM when the NVM may be limited in the number of allowable writes during its lifetime. Accordingly, the registry may be written to the NVM after, for example, hundreds or thousands of operations. Journals may be used to keep track of operations between the writes to store the registry to the NVM, where a registry may point to the current head of a corresponding journal.

A journal may grow as data is added to a file, and thus occupy more memory. Accordingly, after a certain point, the information on the journal may be "pushed" to the registry. Therefore, once a registry is stored to the NVM, the memory occupied by the corresponding journal may be freed.

The journals may therefore be used to update the registry. However, the journals may also be used when a server/node fails due to power failure or other reasons, as well as when load is rebalanced by sending a bucket to a different backend server.

When there is a failure, the receiving server may not be made responsible for a bucket until it is fully up and operational. This may provide, for example, better performance during a period of time of reduced performance at the receiving server for the pieces of metadata to be managed by a bucket at the receiving server.

Generally, quick recovery to full performance after a server failure, or after a power failure to a server may be desired. As part of the recovery, the registry level 1 (L1) caches and the L1 shadow registries may be loaded, and then the level 2 (L2) caches and the L2 shadow registries may be loaded, then the journal may be found for the bucket. The journal may now be replayed so that the various registries may be updated. For example, the L1 caches and the corresponding shadow registries may be updated, then the L2 caches and the corresponding shadow registries may be updated as needed, then the registry in the NVM may be updated as needed.

While a specific process was described, various aspects of the disclosure may use different processes for updating the NVM registry and cache registries. Additionally, there may be a different number of cache levels and/or there may not be shadow registers.

The journal may also be idempotent in that replaying the journal makes the same changes to the registry every time. Accordingly, a journal may be tested upon creation to verify that replaying the journal does not change the registry after the first time. Accordingly, it may also be noted that replaying a journal entry does not change or create a journal entry.

Additionally, since there may be many buckets with the corresponding journals, replaying the journals sequentially may take a very long time. Accordingly, replaying the journals may be optimized by determining temporal relationships among the journals. Therefore, each journal may also define a resource to serialize on. The process may then first do the "scheduling" part of the replay to check what resource(s) each journal entry serializes (or blocks), then the schedule may be optimized for the resources to topologically sort the journals. This may then allow parallel replaying of as many journals as possible to reduce the amount of time it takes to replay all the journals.

The buckets may not be set as ready until all the journals have been successfully played. As long the bucket is not ready, it will not accept new IOs and/or metadata operations. IOs that arrive during this time may get a return code that the bucket is not ready. Accordingly, the responsibility for retries and/or other options may depend on the frontend that sent the IO. This may free up the backend so that the backend does not have to keep track of IO request while it is initializing. This may alleviate any problems that may occur if the system is very large and all the frontends keep sending new IOs toward a bucket that is initializing.

Once all the journals entries have been replayed, the new registry state may be saved to the NVM, and then all the journal entries may be freed. The bucket may then be set as ready to handle IOs.

While FIG. 5 and FIG. 6 have been described with respect to failed servers, it should be noted that severs were specified for ease of description. Generally, the various embodiments described may be for any node where storage is affected. For example, a node may be a server that controls many storage devices, a storage device such as an SSD disk, etc.

Various aspects of the disclosure may provide a method for recovering from a server failure, comprising determining that a first server is inaccessible. When the first server is determined to be inaccessible, a degraded mode read may be performed for read request of data in the inaccessible first server, and a write request to the inaccessible first server may be redirected to another server. There may be a further determination of whether a wait time has elapsed since the determination of the first server to be inaccessible where the wait time starts when the first server is determined to be inaccessible. If so, then data blocks in the first server may be rebuilt, a second server may be selected to replace the inaccessible first server, and the rebuilt data blocks may be moved to the second server. It should be noted that these steps may not need to be done in series. For example, the second server may be determined prior to, during, or after the period when the data blocks are being rebuilt.

The first server may be determined to be inaccessible if a write access to the first server fails. The degraded mode read may comprise, for example, rebuilding a first data block in the inaccessible first server using stripe data blocks associated with the first data block, where each of the stripe data blocks are in a unique server different from the first server, and the rebuilt first data block may be populated in a read cache. The stripe blocks from the different servers may be read in parallel. A read request for the first data block may be serviced by the read cache. Redirecting the write requests may comprise redirecting the write requests to other servers associated with the data block to which the write request was intended. These other servers may have blocks in the same stripe as the data block to which the write request was intended. While the wait time has not elapsed, the degraded mode read may continue to be performed; and a write request to the inaccessible first server may continue to be redirected to another server.

Rebuilding data blocks in the first server may comprise, for each of the data blocks in the first server, using stripe data blocks associated each of the data blocks in the inaccessible first server to rebuild each of the data blocks in the first server, and the stripe data blocks may be read in parallel.

When the first server is one of multiple servers that are inaccessible, data blocks to be rebuilt may be prioritized. The prioritizing may comprise, for example, rebuilding first the one or more data blocks that are most affected by the multiple servers that are inaccessible.

The method may further comprise, for example, receiving a notification from the first server that it is now accessible, determining whether data in the first server is not corrupt, and when the data is determined to be not corrupt, moving any data block that had been written to another server because the first server was inaccessible, to the first server.

Various aspects of the disclosure may further provide a system comprising a plurality of storage devices controlled by a plurality of servers, and may comprise one or more processors configured to determine that a first server is inaccessible. When the first server is determined to be inaccessible, the one or more processors may be configured to set the system to a degraded mode read for data in the first server and set the system to redirect write requests to the first server to other servers. The one or more processors may be configured to determine whether a wait time has elapsed, where the wait time started with the determination of the first server to be inaccessible, and if so, then the one or more processors may be configured to rebuild data blocks in the first server, determine a second server to replace the first server, and move the rebuilt data blocks to the second server. The first server may be determined to be inaccessible if a write access to the first server fails.

The degraded mode read may comprise rebuilding, by the one or more processors, a first data block in the inaccessible first server using stripe data blocks associated with the first data block, where each of the stripe data blocks are in a unique server different from the first server, and populating, by the one or more processors, the rebuilt first data block in a read cache. The stripe data blocks may be read, for example, in parallel.

Redirecting the write requests may comprise redirecting the write requests to other servers associated with the data block to which the write request was intended. Rebuilding data blocks in the in accessible first server may comprise, for example, for each of the data blocks in the first server, reading, by the one or more processors, stripe data blocks associated with each of the data blocks in the first server to rebuild the each of the data blocks in the first server.

When the first server is one of multiple servers that are inaccessible, the one or more processors may prioritize data blocks on the first server to be rebuilt by determining one or more data blocks that are most affected by the multiple servers that are inaccessible.

The one or more processors may be configured to receive a notification from the first server that the first server is online, determine whether data in the first server is not corrupt, and when the data is determined to be not corrupt, move any data blocks that had been written to another server because the first server was inaccessible, to the first server.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise first "circuitry" when executing a first one or more lines of code and may comprise second "circuitry" when executing a second one or more lines of code. As utilized herein, "and/or" means any one or more of the items in the list joined by "and/or." As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

What is claimed is:

1. A method for recovering from a server failure, comprising:
determining that a first server is inaccessible;
starting a wait time when the first server is determined to be inaccessible,
selecting a second server to replace the first server;
after the wait time has elapsed, rebuilding data blocks that are the a first server, wherein before rebuilding:
  each of the data blocks in the first server is associated with a particular stripe of a first plurality of stripes,
  each stripe of the first plurality of stripes spans a different set of servers, and
  each different set of servers comprises at least two servers; and
storing the rebuilt data blocks in the second server, wherein after rebuilding:
  each stripe of a second plurality of stripes comprises at least one data block in the second server,
  each stripe of the second plurality of stripes spans a different set of servers, and
  each different set of servers comprises at least two servers.

2. The method of claim 1, wherein the first server is determined to be inaccessible if a write access to the first server fails.

3. The method of claim 1, wherein the method comprises performing a degraded mode read by:
  rebuilding a first data block in the first server using stripe data blocks associated with the first data block, wherein each of the stripe data blocks is in a unique server different from the first server; and
  populating the rebuilt first data block in a read cache.

4. The method of claim 3, wherein the stripe data blocks are read in parallel.

5. The method of claim 3, wherein a read access request for the first data block is serviced by the read cache.

6. The method of claim 1, wherein the method comprises redirecting the write request to another server associated with the data block to which the write request was intended.

7. The method of claim 1, wherein:
  a degraded mode read is performed for each read request directed to the first server before the wait time elapses; and
  each write request directed to the first server before the wait time elapses is redirected to another server.

8. The method of claim 1, wherein rebuilding the data blocks in the first server comprises, for each of the data blocks in the first server, using stripe data blocks associated with the each of the data blocks in the first server to rebuild the each of the data blocks.

9. The method of claim 8, comprising reading all of the stripe data blocks in parallel.

10. The method of claim 1, comprising, when the first server is one of multiple servers that are inaccessible, prioritizing the data blocks, on the first server, to be rebuilt.

11. The method of claim 10, wherein prioritizing comprises rebuilding first a data block that is most affected by the multiple servers being inaccessible.

12. The method of claim 1, comprising:
receiving a notification from the first server that the first server is online;
determining whether data in the first server is not corrupt; and
when the data is determined to be not corrupt, moving any data block that had been written to another server, while the first server was inaccessible, to the first server.

13. A system comprising a plurality of storage devices controlled by a plurality of servers, comprising:
one or more processors configured to determine that a first server is inaccessible, wherein:
  each of the data blocks in the first server is associated with a particular stripe of a plurality of stripes,
  each stripe of the plurality of stripes spans a different set of servers, and
  each different set of servers comprises at least two servers,
  when the first server is determined to be inaccessible, the one or more processors are configured to determine whether a wait time has elapsed since the determination of the first server to be inaccessible, and
  when the wait time is determined to have elapsed, the one or more processors are configured to:
    rebuild data blocks that are in the first server,
    determine a second server to replace the first server, and
    store the rebuilt data blocks in the second server.

14. The system of claim 13, wherein the first server is determined to be inaccessible if a write access to the first server fails.

15. The system of claim 13, wherein the one or more processors are configured to perform a degraded mode read by:
  rebuilding a first data block in the first server using stripe data blocks associated with the first data block, wherein each of the stripe data blocks is in a unique server different from the first server, and
  populating the rebuilt first data block in a read cache.

16. The system of claim 15, wherein the stripe data blocks are read in parallel.

17. The system of claim 13, wherein the one or more processors are configured to redirect the write request to another server associated with the data block for which the write request was intended.

18. The system of claim 13, wherein rebuilding data blocks in the first server comprises, for each of the data blocks in the first server, reading stripe data blocks associated with the each of the data blocks in the first server.

19. The system of claim 13, wherein, when the first server is one of multiple servers that are inaccessible, the one or more processors are configured to prioritize for rebuilding the data blocks on the first server by determining one or more data blocks that are most affected by the multiple servers being inaccessible.

20. The system of claim 13, wherein the one or more processors are configured to:
receive a notification from the first server that the first server is online;
determine whether data in the first server is not corrupt; and
when the data is determined to be not corrupt, move any data block that had been written to another server, while the first server was inaccessible, to the first server.

* * * * *